US008392285B2

(12) United States Patent
Hahn-Carlson

(10) Patent No.: US 8,392,285 B2
(45) Date of Patent: Mar. 5, 2013

(54) MULTI-SUPPLIER TRANSACTION AND PAYMENT PROGRAMMED PROCESSING APPROACH WITH AT LEAST ONE SUPPLIER

(75) Inventor: Dean W. Hahn-Carlson, Lilydale, MN (US)

(73) Assignee: Syncada LLC, Minneapolis, MN (US)

( * ) Notice: Subject to any disclaimer, the term of this patent is extended or adjusted under 35 U.S.C. 154(b) by 1524 days.

(21) Appl. No.: 11/315,591

(22) Filed: Dec. 22, 2005

(65) Prior Publication Data

US 2006/0167762 A1 Jul. 27, 2006

Related U.S. Application Data

(63) Continuation-in-part of application No. 10/436,878, filed on May 12, 2003, now Pat. No. 7,496,519, and a continuation-in-part of application No. 10/437,405, filed on May 12, 2003, now abandoned, which is a continuation-in-part of application No. 09/259,657, (Continued)

(51) Int. Cl.
*G06Q 10/00* (2012.01)
*G06Q 30/00* (2006.01)
(52) U.S. Cl. .................. 705/26.8; 705/26.81; 705/26.82
(58) Field of Classification Search .................... 705/22, 705/26, 28–29, 50, 64–65, 67, 26.8, 26.81, 705/26.82
See application file for complete search history.

(56) References Cited

U.S. PATENT DOCUMENTS

| | | | |
|---|---|---|---|
| 4,114,027 A | 9/1978 | Slater et al. | |
| 4,270,042 A | 5/1981 | Case | |
| 4,305,059 A | 12/1981 | Benton | |
| 4,412,287 A | 10/1983 | Braddock, III | |
| 4,507,778 A | 3/1985 | Tan | |
| 4,567,359 A | 1/1986 | Lockwood | |
| 4,713,761 A | 12/1987 | Sharpe et al. | |
| 4,725,719 A | 2/1988 | Oncken et al. | |

(Continued)

FOREIGN PATENT DOCUMENTS

| | | |
|---|---|---|
| EP | 0339850 A2 | 2/1989 |
| EP | 0407026 A2 | 1/1991 |

(Continued)

OTHER PUBLICATIONS

Mckeefry ("Seeking microcontrollers desperately", Electronic Buyers News, n 972, p. E4+, Sep. 11, 1995).*

(Continued)

*Primary Examiner* — James D Nigh
(74) *Attorney, Agent, or Firm* — Shumaker & Sieffert, P.A.

(57) ABSTRACT

In an example embodiment, a computer-based contract-management approach processes transactions involving at least one supplier (i.e., seller or sellers) fulfilling one or more sub-components of the transaction. Each of the suppliers (e.g., as well as other transaction parties) reference the transaction when communicating transaction information such as invoices, regardless of which sub-component of the transaction the seller is involved with. The invoices are associated with the transaction using the transaction referenced in each invoice and each supplier is accordingly paid for its performance of the sub-component of the transaction with which it is involved. From a buyer's perspective, the transaction is processed in accordance with the sub-components associated with the at least one supplier. Per each supplier, the transaction is processed generally two-dimensionally (via buyer and via suppliers), thus generally isolating (where desirable) each supplier from the sub-components of the transaction for which it is not a participant.

19 Claims, 3 Drawing Sheets

Related U.S. Application Data filed on Feb. 26, 1999, now Pat. No. 6,571,149, which is a continuation of application No. 08/748,243, filed on Nov. 12, 1996, now Pat. No. 5,910,896.

(60) Provisional application No. 60/639,998, filed on Dec. 29, 2004, provisional application No. 60/639,999, filed on Dec. 29, 2004.

U.S. PATENT DOCUMENTS

| | | |
|---|---|---|
| 4,750,119 A | 6/1988 | Cohen et al. |
| 4,799,156 A | 1/1989 | Shavit et al. |
| 4,926,325 A | 5/1990 | Benton et al. |
| 4,949,272 A | 8/1990 | Vanourek et al. |
| 4,960,981 A | 10/1990 | Benton et al. |
| 4,992,940 A | 2/1991 | Dworkin |
| 4,995,112 A | 2/1991 | Aoyama |
| 4,996,662 A | 2/1991 | Cooper et al. |
| 5,008,827 A | 4/1991 | Sansone et al. |
| 5,017,766 A | 5/1991 | Tamada et al. |
| 5,025,372 A | 6/1991 | Burton et al. |
| 5,040,132 A | 8/1991 | Schuricht et al. |
| 5,043,908 A | 8/1991 | Manduley et al. |
| 5,054,096 A | 10/1991 | Beizer |
| 5,077,694 A | 12/1991 | Sansone et al. |
| 5,117,364 A | 5/1992 | Barns-Slavin et al. |
| 5,151,948 A | 9/1992 | Lyke |
| 5,153,842 A | 10/1992 | Dlugos, Sr. et al. |
| 5,159,667 A | 10/1992 | Borrey et al. |
| 5,161,109 A | 11/1992 | Keating et al. |
| 5,168,444 A | 12/1992 | Cukor et al. |
| 5,175,416 A | 12/1992 | Mansvelt et al. |
| 5,208,446 A | 5/1993 | Martinez |
| 5,218,188 A | 6/1993 | Hanson |
| 5,220,501 A | 6/1993 | Lawlor et al. |
| 5,222,018 A | 6/1993 | Sharpe et al. |
| 5,231,569 A | 7/1993 | Myatt et al. |
| 5,238,349 A | 8/1993 | Grace, Sr. |
| 5,285,383 A | 2/1994 | Lindsey et al. |
| 5,293,310 A | 3/1994 | Carroll et al. |
| 5,329,589 A | 7/1994 | Fraser et al. |
| 5,334,823 A | 8/1994 | Noblett, Jr. et al. |
| 5,334,824 A | 8/1994 | Martinez |
| 5,337,246 A | 8/1994 | Carroll et al. |
| 5,357,563 A | 10/1994 | Hamilton et al. |
| 5,393,963 A | 2/1995 | Thomas et al. |
| 5,426,281 A | 6/1995 | Abecassis |
| 5,440,634 A | 8/1995 | Jones et al. |
| 5,483,445 A | 1/1996 | Pickering |
| 5,485,369 A | 1/1996 | Nicholls et al. |
| 5,500,513 A | 3/1996 | Langhans et al. |
| 5,631,821 A | 5/1997 | Muso |
| 5,631,827 A | 5/1997 | Nicholls et al. |
| 5,652,749 A | 7/1997 | Davenport et al. |
| 5,666,493 A | 9/1997 | Wojcik et al. |
| 5,671,362 A | 9/1997 | Cowe et al. |
| 5,677,955 A | 10/1997 | Doggett et al. |
| 5,694,334 A | 12/1997 | Donahue et al. |
| 5,694,551 A | 12/1997 | Doyle et al. |
| 5,699,528 A | 12/1997 | Hogan |
| 5,712,990 A | 1/1998 | Henderson |
| 5,717,989 A | 2/1998 | Tozzoli et al. |
| 5,719,771 A | 2/1998 | Buck et al. |
| 5,732,400 A | 3/1998 | Mandler |
| 5,754,854 A | 5/1998 | Kanamori et al. |
| 5,770,844 A | 6/1998 | Henn |
| 5,774,170 A | 6/1998 | Hite et al. |
| 5,790,790 A | 8/1998 | Smith et al. |
| 5,794,207 A | 8/1998 | Walker et al. |
| 5,799,286 A | 8/1998 | Morgan et al. |
| 5,806,063 A | 9/1998 | Dickens |
| 5,842,178 A | 11/1998 | Giovannoli |
| 5,845,283 A | 12/1998 | Williams |
| 5,870,719 A | 2/1999 | Maritzen et al. |
| 5,892,900 A | 4/1999 | Ginter et al. |
| 5,893,080 A | 4/1999 | McGurl et al. |
| 5,896,530 A | 4/1999 | White |
| 5,897,645 A | 4/1999 | Watters |
| 5,910,896 A | 6/1999 | Hahn-Carlson |
| 5,917,830 A | 6/1999 | Chen et al. |
| 5,918,216 A | 6/1999 | Miksovsky et al. |
| 5,918,229 A | 6/1999 | Davis et al. |
| 5,920,847 A | 7/1999 | Kolling et al. |
| 5,924,082 A | 7/1999 | Silverman et al. |
| 5,924,083 A | 7/1999 | Silverman et al. |
| 5,930,363 A | 7/1999 | Stanford et al. |
| 5,931,917 A | 8/1999 | Nguyen et al. |
| 5,943,670 A | 8/1999 | Prager et al. |
| 5,956,690 A | 9/1999 | Haggerson et al. |
| 5,956,700 A | 9/1999 | Landry |
| 5,960,407 A | 9/1999 | Vivona |
| 5,970,475 A | 10/1999 | Barnes et al. |
| 5,973,685 A | 10/1999 | Schaffa et al. |
| 5,978,567 A | 11/1999 | Rebane et al. |
| 5,982,891 A | 11/1999 | Ginter et al. |
| 5,987,506 A | 11/1999 | Carter et al. |
| 5,991,728 A | 11/1999 | Debusk et al. |
| 5,991,801 A | 11/1999 | Rebec et al. |
| 5,995,976 A | 11/1999 | Walker et al. |
| 6,012,041 A | 1/2000 | Brewer et al. |
| 6,016,477 A | 1/2000 | Ehnebuske et al. |
| 6,021,202 A | 2/2000 | Anderson et al. |
| 6,026,374 A | 2/2000 | Chess |
| 6,029,140 A | 2/2000 | Martin et al. |
| 6,029,150 A | 2/2000 | Kravitz |
| 6,043,819 A | 3/2000 | LeBrun et al. |
| 6,044,362 A | 3/2000 | Neely |
| 6,047,268 A | 4/2000 | Bartoli et al. |
| 6,055,519 A | 4/2000 | Kennedy et al. |
| 6,058,380 A | 5/2000 | Anderson et al. |
| 6,070,150 A | 5/2000 | Remington et al. |
| 6,085,200 A | 7/2000 | Hill et al. |
| 6,097,834 A | 8/2000 | Krouse et al. |
| 6,115,649 A | 9/2000 | Sakata |
| 6,115,711 A | 9/2000 | White |
| 6,119,163 A | 9/2000 | Montiero et al. |
| 6,128,602 A | 10/2000 | Northington et al. |
| 6,131,087 A | 10/2000 | Luke et al. |
| 6,141,653 A | 10/2000 | Conklin et al. |
| 6,151,588 A | 11/2000 | Tozzoli et al. |
| 6,157,924 A | 12/2000 | Austin |
| 6,167,378 A | 12/2000 | Webber, Jr. |
| 6,169,542 B1 | 1/2001 | Hooks et al. |
| 6,199,046 B1 | 3/2001 | Heinzle et al. |
| 6,204,763 B1 | 3/2001 | Sone |
| 6,209,095 B1 | 3/2001 | Anderson et al. |
| 6,223,168 B1 | 4/2001 | McGurl et al. |
| 6,236,972 B1 | 5/2001 | Shkedy |
| 6,246,994 B1 | 6/2001 | Wolven et al. |
| 6,254,000 B1 | 7/2001 | Degen et al. |
| 6,260,024 B1 | 7/2001 | Shkedy |
| 6,266,640 B1 | 7/2001 | Fromm et al. |
| 6,267,292 B1 | 7/2001 | Walker et al. |
| 6,275,813 B1 | 8/2001 | Berka |
| 6,285,916 B1 | 9/2001 | Kadaba et al. |
| 6,317,737 B1 | 11/2001 | Gorelik et al. |
| 6,323,894 B1 | 11/2001 | Katz et al. |
| 6,324,522 B2 | 11/2001 | Peterson et al. |
| 6,324,551 B1 | 11/2001 | Lamping et al. |
| 6,330,550 B1 | 12/2001 | Brisebois et al. |
| 6,338,044 B1 | 1/2002 | Cook et al. |
| 6,357,042 B2 | 3/2002 | Srinivasan et al. |
| 6,366,829 B1 | 4/2002 | Wallace |
| 6,381,587 B1 | 4/2002 | Guzelsu |
| 6,389,402 B1 | 5/2002 | Ginter et al. |
| 6,418,441 B1 | 7/2002 | Call |
| 6,421,691 B1 | 7/2002 | Kajitani |
| 6,442,533 B1 | 8/2002 | Hinkle |
| 6,477,510 B1 | 11/2002 | Johnson |
| 6,486,899 B1 | 11/2002 | Bush et al. |
| 6,490,567 B1 | 12/2002 | Gregory |
| 6,493,685 B1 | 12/2002 | Ensel et al. |
| 6,499,036 B1 | 12/2002 | Gurevich |
| 6,505,169 B1 | 1/2003 | Bhagavath et al. |
| 6,505,172 B1 | 1/2003 | Johnson et al. |
| 6,507,826 B1 | 1/2003 | Maners |

| | | | | | | |
|---|---|---|---|---|---|---|
| 6,510,383 B1 | 1/2003 | Jones | | 7,415,471 B1 | 8/2008 | Coleman |
| 6,510,384 B2 | 1/2003 | Okano | | 7,415,617 B1 | 8/2008 | Ginter et al. |
| 6,526,443 B1 | 2/2003 | Goldsmith et al. | | 7,433,845 B1 | 10/2008 | Flitcroft et al. |
| 6,539,360 B1 | 3/2003 | Kadaba | | 7,437,310 B1 | 10/2008 | Dutta |
| 6,571,149 B1 | 5/2003 | Hahn-Carlson | | 7,448,063 B2 | 11/2008 | Freeman et al. |
| 6,598,026 B1 | 7/2003 | Ojha et al. | | 7,475,024 B1 | 1/2009 | Phan |
| 6,607,081 B2 | 8/2003 | Graef et al. | | 7,496,519 B2 | 2/2009 | Hahn-Carlson et al. |
| 6,629,081 B1 | 9/2003 | Cornelius et al. | | 7,499,875 B1 | 3/2009 | May et al. |
| 6,673,479 B2 | 1/2004 | McArthur et al. | | 7,529,706 B2 | 5/2009 | Kulasooriya et al. |
| 6,684,384 B1 | 1/2004 | Bickerton et al. | | 7,536,354 B1 | 5/2009 | DeGroeve et al. |
| 6,687,713 B2 | 2/2004 | Mattson et al. | | 7,536,362 B2 | 5/2009 | Starr et al. |
| 6,697,702 B1 | 2/2004 | Hahn-Carlson | | 7,548,884 B1 | 6/2009 | Thomas |
| 6,704,612 B1 | 3/2004 | Hahn-Carlson | | 7,558,793 B1 | 7/2009 | Topolovac et al. |
| 6,721,613 B1 | 4/2004 | Yamamoto et al. | | 7,574,363 B2 | 8/2009 | Bodin |
| 6,721,715 B2 | 4/2004 | Nemzow | | 7,574,386 B2 | 8/2009 | Hahn-Carlson et al. |
| 6,741,968 B2 | 5/2004 | Jacoves et al. | | 7,587,363 B2 | 9/2009 | Cataline et al. |
| 6,751,630 B1 | 6/2004 | Franks et al. | | 7,590,575 B2 | 9/2009 | Yu et al. |
| 6,785,661 B1 | 8/2004 | Mandler et al. | | 7,617,146 B2 | 11/2009 | Keaton et al. |
| 6,789,252 B1 | 9/2004 | Burke et al. | | 7,627,499 B2 | 12/2009 | Hahn-Carlson |
| 6,792,459 B2 | 9/2004 | Elnozahy et al. | | 7,634,455 B1 | 12/2009 | Keene et al. |
| 6,820,038 B1 * | 11/2004 | Wetzer et al. ............... 702/184 | | 7,640,195 B2 | 12/2009 | Von Zimmermann et al. |
| 6,829,590 B1 | 12/2004 | Greener et al. | | 7,660,788 B1 | 2/2010 | Clark |
| 6,832,212 B1 | 12/2004 | Zenner et al. | | 7,693,791 B2 | 4/2010 | Hahn-Carlson et al. |
| 6,833,865 B1 | 12/2004 | Fuller et al. | | 7,702,563 B2 | 4/2010 | Balson et al. |
| 6,850,900 B1 | 2/2005 | Hare et al. | | 7,725,372 B2 | 5/2010 | Hahn-Carlson |
| 6,873,963 B1 | 3/2005 | Westbury et al. | | 7,765,136 B2 | 7/2010 | Northington et al. |
| 6,873,997 B1 | 3/2005 | Majjasie et al. | | 7,822,653 B2 | 10/2010 | Hahn-Carlson et al. |
| 6,879,962 B1 | 4/2005 | Smith et al. | | 7,890,395 B2 | 2/2011 | Phelan |
| 6,882,983 B2 | 4/2005 | Furphy et al. | | 7,925,551 B2 | 4/2011 | Hahn-Carlson et al. |
| 6,882,986 B1 | 4/2005 | Heinemann et al. | | 7,970,671 B2 | 6/2011 | Hahn-Carlson et al. |
| 6,889,194 B1 | 5/2005 | Kadaba | | 8,050,938 B1 | 11/2011 | Green et al. |
| 6,895,438 B1 | 5/2005 | Ulrich | | 8,060,410 B2 | 11/2011 | Hahn-Carlson |
| 6,915,268 B2 | 7/2005 | Riggs et al. | | 8,069,054 B2 | 11/2011 | Hahn-Carlson et al. |
| 6,937,992 B1 | 8/2005 | Benda et al. | | 8,103,575 B1 | 1/2012 | Hinkle |
| 6,941,281 B1 | 9/2005 | Johnson | | 8,126,785 B2 | 2/2012 | Hahn-Carlson et al. |
| 6,944,595 B1 | 9/2005 | Graser et al. | | 2001/0009002 A1 | 7/2001 | Logan et al. |
| 6,973,258 B1 | 12/2005 | Yoo et al. | | 2001/0011241 A1 | 8/2001 | Nemzow |
| 6,983,278 B1 | 1/2006 | Yu et al. | | 2001/0014878 A1 | 8/2001 | Mitra |
| 6,988,111 B2 | 1/2006 | Chow et al. | | 2001/0025262 A1 | 9/2001 | Ahmed |
| 6,999,943 B1 | 2/2006 | Johnson et al. | | 2001/0032154 A1 | 10/2001 | Schlummer |
| 7,047,210 B1 | 5/2006 | Srinivasan | | 2001/0032171 A1 | 10/2001 | Brink et al. |
| 7,054,841 B1 | 5/2006 | Tenorio | | 2001/0032183 A1 | 10/2001 | Landry |
| 7,069,234 B1 | 6/2006 | Cornelius et al. | | 2001/0039522 A1 | 11/2001 | Saxon |
| 7,069,248 B2 | 6/2006 | Huber | | 2001/0047311 A1 | 11/2001 | Singh |
| 7,076,652 B2 | 7/2006 | Ginter et al. | | 2001/0056395 A1 | 12/2001 | Khan |
| 7,079,176 B1 | 7/2006 | Freeman et al. | | 2002/0007302 A1 | 1/2002 | Work et al. |
| 7,099,304 B2 | 8/2006 | Liu et al. | | 2002/0016765 A1 | 2/2002 | Sacks et al. |
| 7,110,959 B2 | 9/2006 | Hahn-Carlson | | 2002/0026374 A1 | 2/2002 | Moneymaker et al. |
| 7,110,979 B2 | 9/2006 | Tree | | 2002/0032649 A1 | 3/2002 | Selvarajan |
| 7,113,964 B1 | 9/2006 | Bequet et al. | | 2002/0035488 A1 | 3/2002 | Aquila et al. |
| 7,117,170 B1 | 10/2006 | Bennett et al. | | 2002/0038277 A1 | 3/2002 | Yuan |
| 7,120,871 B1 | 10/2006 | Harrington | | 2002/0038305 A1 | 3/2002 | Bahl et al. |
| 7,124,150 B2 | 10/2006 | Majjasie et al. | | 2002/0040304 A1 | 4/2002 | Shenoy et al. |
| 7,130,822 B1 | 10/2006 | Their et al. | | 2002/0042782 A1 | 4/2002 | Albazz et al. |
| 7,131,069 B1 | 10/2006 | Rush et al. | | 2002/0046081 A1 | 4/2002 | Albazz et al. |
| 7,133,835 B1 | 11/2006 | Fusz et al. | | 2002/0046125 A1 | 4/2002 | Speicher et al. |
| 7,136,467 B2 | 11/2006 | Brockman et al. | | 2002/0046147 A1 | 4/2002 | Livesay et al. |
| 7,143,058 B2 | 11/2006 | Sugimoto et al. | | 2002/0046169 A1 | 4/2002 | Keresman et al. |
| 7,146,337 B1 | 12/2006 | Ward et al. | | 2002/0048369 A1 | 4/2002 | Ginter et al. |
| 7,149,744 B1 | 12/2006 | Tenorio | | 2002/0049622 A1 | 4/2002 | Lettich et al. |
| 7,162,458 B1 | 1/2007 | Flangan et al. | | 2002/0055850 A1 | 5/2002 | Powell et al. |
| 7,177,836 B1 | 2/2007 | German et al. | | 2002/0059122 A1 | 5/2002 | Inoue et al. |
| 7,181,017 B1 | 2/2007 | Nagel et al. | | 2002/0059134 A1 | 5/2002 | Ebbs et al. |
| 7,203,662 B2 | 4/2007 | Das et al. | | 2002/0062278 A1 | 5/2002 | Ingram et al. |
| 7,206,768 B1 | 4/2007 | DeGroeve et al. | | 2002/0065736 A1 | 5/2002 | Willner et al. |
| 7,222,081 B1 | 5/2007 | Sone | | 2002/0065738 A1 | 5/2002 | Riggs et al. |
| 7,243,139 B2 | 7/2007 | Ullman et al. | | 2002/0069177 A1 | 6/2002 | Carrott et al. |
| 7,254,588 B2 | 8/2007 | Sung et al. | | 2002/0072956 A1 | 6/2002 | Willems et al. |
| 7,257,560 B2 | 8/2007 | Jacobs et al. | | 2002/0077978 A1 | 6/2002 | O'Leary et al. |
| 7,263,506 B2 | 8/2007 | Lee et al. | | 2002/0087344 A1 | 7/2002 | Billings et al. |
| 7,324,976 B2 | 1/2008 | Gupta et al. | | 2002/0087455 A1 | 7/2002 | Tsagarakis |
| 7,327,952 B2 | 2/2008 | Enomoto | | 2002/0095355 A1 | 7/2002 | Walker et al. |
| 7,340,433 B1 | 3/2008 | Kay et al. | | 2002/0103661 A1 | 8/2002 | Albazz et al. |
| 7,346,575 B1 | 3/2008 | Ahles et al. | | 2002/0107761 A1 | 8/2002 | Kark et al. |
| 7,363,261 B2 | 4/2008 | Whitehead et al. | | 2002/0107794 A1 | 8/2002 | Furphy et al. |
| 7,366,684 B1 * | 4/2008 | Douglas ............... 705/26.81 | | 2002/0111886 A1 | 8/2002 | Chenevich et al. |
| 7,373,365 B2 | 5/2008 | Varadarajan et al. | | 2002/0116288 A1 | 8/2002 | Nakajima |
| 7,386,502 B1 | 6/2008 | Butcher, III | | 2002/0116334 A1 | 8/2002 | Bennett et al. |
| 7,392,934 B2 | 7/2008 | Hahn-Carlson et al. | | 2002/0116348 A1 | 8/2002 | Phillips et al. |

| | | |
|---|---|---|
| 2002/0120570 A1 | 8/2002 | Loy |
| 2002/0123919 A1 | 9/2002 | Brockman et al. |
| 2002/0123973 A1 | 9/2002 | Eccles et al. |
| 2002/0143858 A1 | 10/2002 | Teague et al. |
| 2002/0147655 A1 | 10/2002 | Say |
| 2002/0156797 A1 | 10/2002 | Lee et al. |
| 2002/0161719 A1 | 10/2002 | Manning et al. |
| 2002/0174034 A1 | 11/2002 | Au et al. |
| 2002/0184527 A1 | 12/2002 | Chun et al. |
| 2002/0194174 A1 | 12/2002 | Calkins et al. |
| 2002/0198829 A1 | 12/2002 | Ludwig et al. |
| 2002/0198833 A1 | 12/2002 | Wohlstadter |
| 2003/0004823 A1 | 1/2003 | Sagy |
| 2003/0005876 A1 | 1/2003 | Boswell |
| 2003/0014325 A1 | 1/2003 | Biffar et al. |
| 2003/0018563 A1 | 1/2003 | Kilgour et al. |
| 2003/0026404 A1 | 2/2003 | Joyce et al. |
| 2003/0033205 A1 | 2/2003 | Nowers et al. |
| 2003/0033240 A1 | 2/2003 | Balson et al. |
| 2003/0041008 A1 | 2/2003 | Grey et al. |
| 2003/0046089 A1 | 3/2003 | Menninger et al. |
| 2003/0050876 A1 | 3/2003 | Tawara et al. |
| 2003/0055675 A1 | 3/2003 | Klein Twennaar |
| 2003/0055779 A1 | 3/2003 | Wolf |
| 2003/0055783 A1 | 3/2003 | Cataline et al. |
| 2003/0074206 A1 | 4/2003 | Hoffman et al. |
| 2003/0074298 A1 | 4/2003 | Duam |
| 2003/0093320 A1 | 5/2003 | Sullivan |
| 2003/0097318 A1 | 5/2003 | Yu et al. |
| 2003/0115129 A1 | 6/2003 | Feaver |
| 2003/0117446 A1 | 6/2003 | Esposito-Ross et al. |
| 2003/0126047 A1 | 7/2003 | Hollar et al. |
| 2003/0135425 A1 | 7/2003 | Leavitt |
| 2003/0135435 A1 | 7/2003 | Aharoni |
| 2003/0139985 A1 | 7/2003 | Hollar et al. |
| 2003/0144901 A1 | 7/2003 | Coultier et al. |
| 2003/0154163 A1 | 8/2003 | Phillips et al. |
| 2003/0158811 A1 | 8/2003 | Sanders et al. |
| 2003/0163431 A1 | 8/2003 | Ginter et al. |
| 2003/0187796 A1 | 10/2003 | Swift et al. |
| 2003/0191711 A1 | 10/2003 | Jamison et al. |
| 2003/0195815 A1 | 10/2003 | Li et al. |
| 2003/0200172 A1 | 10/2003 | Randle |
| 2003/0200185 A1 | 10/2003 | Huerta et al. |
| 2003/0212617 A1 | 11/2003 | Stone et al. |
| 2003/0220863 A1 | 11/2003 | Holm et al. |
| 2003/0225883 A1 | 12/2003 | Greaves et al. |
| 2003/0233252 A1 | 12/2003 | Haskell et al. |
| 2003/0233286 A1 | 12/2003 | Hahn-Carlson et al. |
| 2003/0233292 A1 | 12/2003 | Richey et al. |
| 2003/0233321 A1 | 12/2003 | Scolini et al. |
| 2004/0010463 A1 | 1/2004 | Hahn-Carlson |
| 2004/0019562 A1 | 1/2004 | Viberg |
| 2004/0034578 A1 | 2/2004 | Oney et al. |
| 2004/0039696 A1 | 2/2004 | Harmon et al. |
| 2004/0049446 A1 | 3/2004 | Seljeseth |
| 2004/0068431 A1 | 4/2004 | Smith et al. |
| 2004/0095237 A1 | 5/2004 | Chen et al. |
| 2004/0098350 A1 | 5/2004 | Labrou et al. |
| 2004/0098663 A1 | 5/2004 | Rey et al. |
| 2004/0107123 A1 | 6/2004 | Haffner et al. |
| 2004/0107125 A1 | 6/2004 | Guheen et al. |
| 2004/0117383 A1 | 6/2004 | Lee et al. |
| 2004/0123129 A1 | 6/2004 | Ginter et al. |
| 2004/0139032 A1 | 7/2004 | Rowan |
| 2004/0153389 A1 | 8/2004 | Lortscher |
| 2004/0153403 A1 | 8/2004 | Sadre |
| 2004/0153407 A1 | 8/2004 | Club et al. |
| 2004/0158510 A1 | 8/2004 | Fisher |
| 2004/0172360 A1 | 9/2004 | Mabrey et al. |
| 2004/0172368 A1 | 9/2004 | Johnson et al. |
| 2004/0181468 A1 | 9/2004 | Harmon et al. |
| 2004/0184163 A1 | 9/2004 | Nishioka et al. |
| 2004/0186806 A1 | 9/2004 | Sinclair et al. |
| 2004/0187075 A1 | 9/2004 | Maxham et al. |
| 2004/0201074 A1 | 10/2004 | Khandros et al. |
| 2004/0225574 A1 | 11/2004 | Arnold et al. |
| 2004/0230536 A1 | 11/2004 | Fung et al. |
| 2004/0230601 A1 | 11/2004 | Joao et al. |
| 2004/0243690 A1 | 12/2004 | Hancock et al. |
| 2004/0254808 A1 | 12/2004 | Bennett et al. |
| 2004/0260634 A1 | 12/2004 | King et al. |
| 2005/0015332 A1 | 1/2005 | Chen |
| 2005/0021363 A1 | 1/2005 | Stimson et al. |
| 2005/0021527 A1 | 1/2005 | Zhang et al. |
| 2005/0027613 A1 | 2/2005 | Takekuma et al. |
| 2005/0027651 A1 | 2/2005 | DeVault et al. |
| 2005/0033660 A1 | 2/2005 | Solomon |
| 2005/0033760 A1 | 2/2005 | Fuller et al. |
| 2005/0055306 A1 | 3/2005 | Miller et al. |
| 2005/0075964 A1 | 4/2005 | Quinn et al. |
| 2005/0119980 A1 | 6/2005 | Kohavi et al. |
| 2005/0125260 A1 | 6/2005 | Green et al. |
| 2005/0131839 A1 | 6/2005 | Cordery et al. |
| 2005/0137947 A1 | 6/2005 | Schaub et al. |
| 2005/0149378 A1 | 7/2005 | Cyr et al. |
| 2005/0165699 A1 | 7/2005 | Hahn-Carlson |
| 2005/0177435 A1* | 8/2005 | Lidow ............... 705/22 |
| 2005/0177507 A1 | 8/2005 | Bandych et al. |
| 2005/0192896 A1 | 9/2005 | Hutchison et al. |
| 2005/0216368 A1 | 9/2005 | Wechsel |
| 2005/0234820 A1 | 10/2005 | MacKouse |
| 2005/0240592 A1 | 10/2005 | Mamou et al. |
| 2005/0246192 A1 | 11/2005 | Jauffred et al. |
| 2005/0251478 A1 | 11/2005 | Yanavi |
| 2005/0256802 A1 | 11/2005 | Ammermann et al. |
| 2005/0274792 A1 | 12/2005 | Hahn-Carlson et al. |
| 2005/0278220 A1 | 12/2005 | Hahn-Carlson et al. |
| 2005/0278221 A1 | 12/2005 | Hahn-Carlson et al. |
| 2005/0278244 A1 | 12/2005 | Yuan |
| 2005/0278251 A1 | 12/2005 | Hahn-Carlson |
| 2005/0278255 A1 | 12/2005 | Hahn-Carlson et al. |
| 2005/0283434 A1 | 12/2005 | Hahn-Carlson et al. |
| 2005/0283437 A1 | 12/2005 | McRae et al. |
| 2005/0289023 A1 | 12/2005 | Hahn-Carlson et al. |
| 2005/0289024 A1 | 12/2005 | Hahn-Carlson |
| 2006/0004670 A1 | 1/2006 | McKenney et al. |
| 2006/0010058 A1 | 1/2006 | D'Hers et al. |
| 2006/0015454 A1 | 1/2006 | Hahn-Carlson |
| 2006/0036476 A1* | 2/2006 | Klem ............... 705/7 |
| 2006/0116957 A1 | 6/2006 | May et al. |
| 2006/0167762 A1 | 7/2006 | Hahn-Carlson |
| 2006/0167791 A1 | 7/2006 | Hahn-Carlson |
| 2006/0167792 A1 | 7/2006 | Hahn-Carlson |
| 2006/0233334 A1 | 10/2006 | Bingaman et al. |
| 2006/0287953 A1 | 12/2006 | Chauhan |
| 2007/0022021 A1 | 1/2007 | Walker et al. |
| 2007/0055582 A1 | 3/2007 | Hahn-Carlson |
| 2007/0136278 A1 | 6/2007 | Grazioli et al. |
| 2007/0156584 A1 | 7/2007 | Barnes et al. |
| 2007/0192178 A1 | 8/2007 | Fung et al. |
| 2007/0208635 A1 | 9/2007 | Van Luchene et al. |
| 2007/0214065 A1 | 9/2007 | Kahlon et al. |
| 2007/0214077 A1 | 9/2007 | Barnes et al. |
| 2007/0246528 A1 | 10/2007 | Kubo et al. |
| 2007/0262140 A1 | 11/2007 | Long |
| 2007/0271160 A1 | 11/2007 | Stone et al. |
| 2007/0282724 A1 | 12/2007 | Barnes et al. |
| 2007/0282744 A1 | 12/2007 | Barnes et al. |
| 2008/0082374 A1 | 4/2008 | Kennis et al. |
| 2008/0086396 A1 | 4/2008 | Hahn-Carlson |
| 2008/0103972 A1 | 5/2008 | Lanc |
| 2008/0172314 A1 | 7/2008 | Hahn-Carlson |
| 2008/0215456 A1 | 9/2008 | West et al. |
| 2008/0249940 A1 | 10/2008 | Hahn-Carlson et al. |
| 2009/0171727 A1 | 7/2009 | Hahn-Carlson |
| 2009/0192922 A1 | 7/2009 | Hahn-Carlson |
| 2009/0259576 A1 | 10/2009 | Hahn-Carlson |
| 2009/0265274 A1 | 10/2009 | Hahn-Carlson et al. |
| 2009/0287590 A1 | 11/2009 | Hahn-Carlson |
| 2009/0287598 A1 | 11/2009 | Hahn-Carlson |
| 2009/0292630 A1 | 11/2009 | Hahn-Carlson et al. |
| 2009/0307114 A1 | 12/2009 | Hahn-Carlson |
| 2010/0017315 A1 | 1/2010 | Hahn-Carlson |
| 2010/0049650 A1 | 2/2010 | Keaton et al. |
| 2010/0070397 A1 | 3/2010 | Hahn-Carlson et al. |
| 2010/0138325 A1 | 6/2010 | Hahn-Carlson |
| 2010/0185540 A1 | 7/2010 | Hahn-Carlson et al. |

| | | | |
|---|---|---|---|
| 2010/0205054 | A1 | 8/2010 | Hahn-Carlson et al. |
| 2011/0004544 | A1 | 1/2011 | Baum |
| 2011/0029404 | A1 | 2/2011 | Hahn-Carlson et al. |
| 2012/0158558 | A1 | 6/2012 | Hahn-Carlson et al. |

FOREIGN PATENT DOCUMENTS

| | | | |
|---|---|---|---|
| EP | 0425421 | A2 | 5/1991 |
| EP | 0779587 | A2 | 6/1997 |
| EP | 1659526 | A2 * | 5/2006 |
| FR | 2543327 | A1 | 9/1984 |
| GB | 2398894 | A | 9/2004 |
| JP | 2001312680 | A | 11/2001 |
| WO | WO 97/07468 | A1 | 2/1997 |
| WO | WO 99/08218 | A1 | 2/1999 |
| WO | WO 00/62225 | A1 | 10/2000 |
| WO | WO 01/09782 | A2 | 2/2001 |
| WO | WO 01/35570 | A1 | 5/2001 |
| WO | WO 01/48659 | A1 | 7/2001 |
| WO | WO 0182193 | | 11/2001 |
| WO | WO 0188813 | | 11/2001 |
| WO | WO 01/26017 | A2 | 12/2001 |
| WO | WO 02/21405 | A1 | 3/2002 |
| WO | WO 02/006920 | A2 | 9/2002 |
| WO | WO 2005/124635 | A2 | 12/2005 |
| WO | WO 2006/071881 | A2 | 7/2006 |
| WO | WO 2008/045793 | A1 | 4/2008 |

OTHER PUBLICATIONS

Mallory "Great Plains Accounting v.7. (Great Plains Software's accounting software) (Product Announcement), Newsbytes, NEW04220018, Apr. 22, 1993, 2 pages".*

Russell ("Kitting out is now in (Use of component kits is expanding as distributors develop added-value activities", Electronic Times (Online), n 852, p. SXVII, Apr. 1997, 4 pages).*

Spencer et al., "JIT Systems and external logistices suppliers," International Journal of Operations & Production Management, v14, n6, pp. 60-74, 1994.

White, How Computers Work, Sep. 1999, 93 pp.

Professional Builder (1993) www.highbeam.com, Contracts & Law: Part III 8 pp.

South China Morning Post, Hong Kong, Buying "Products over the Net," Jul. 2000, 2 pp.

Xcitek Press Release, "U.S. Bank Selects Xcitek for Corporate Actions Data and XSP for Corporate Actions Automation," NY, NY, Dec. 2003, 1 pp.

Berhad, "Fueling financial oil for the economy," The New Straits Times Press (Malaysia), Dec. 10, 2001, 3 pp.

Singh, "A new road to recovery," Risk, pp. 108-110, Sep. 2004.

"Credit Derivatives and Mortgage-backed Bonds in Capital Adequacy Requirements for Market Risk," http://www.rahoitustarkastus.fi/Eng/Regulation/FSA_standards/FSA_interpretations/4_2005.html, Apr. 2005, 5 pp.

Brochure: SAP Supplier Relationship Management—At a Glance, SAP, 2003, 16 pp.

Brochure: Self-Service Procurement: Slashing Costs and Saving Time, SAP, 2003, 12 pp.

Electronic Commerce News, "Sarbanes-Oxley Continue to be Key Issue in Corporate Payments Space," Sep. 1, 2003, v8, issue 18, 7 pp.

Fletcher, "Limits on reinsurance offsets sought by California regulator," Business Insurance, May 8, 1995 4 pp.

Denver Business Wire, "JD Edwards Continues to drive network-centric applications delivery with OneWorld enhancements," Jun. 16, 1997, p. 06160089.

Notice from the European Patent Office concerning business methods, dated Oct. 1, 2007, 2 pp.

Egan, "Administrative Orders from the Office of the Governer of Alaska," Jul. 18, 1972, 3 pp. http://www.gov.state.ak.us/admin-orders/018.html.

Bodnar, "Estimating Exchange Rate Exposure: Issues in Model Structure," Financial Management v32, n1, pp. 35-67, 2003.

Plewka, "Germany seizes the Emu initiative," International Tax Review, v8, n5, pp. 43-46, May 1997.

Huang, "Exchange Risk and Exchange Rate Pass-Through," v67/02-A of Dissertation Abstracts International, 2005.

U.S. Appl. No. 13/406,247, by Dean Hahn-Carlson, filed Feb. 27, 2012.

Decision on Appeal from U.S. Appl. No. 11/316,324 dated Oct. 26, 2012, 14 pp.

* cited by examiner

MULTI-SUPPLIER TRANSACTION AND PAYMENT PROGRAMMED PROCESSING APPROACH WITH AT LEAST ONE SUPPLIER

RELATED DOCUMENTS

This patent document claims benefit under 35 U.S.C. §119 (e) to U.S. Provisional Patent Application No. 60/639,998, entitled "Multi-supplier Transaction and Payment Programmed Processing System and Approach," filed on Dec. 29, 2004, and to U.S. Provisional Patent Application No. 60/639,999, entitled "Multi-party Transaction Processing System and Approach," also filed on Dec. 29, 2004; this patent document is also a continuation-in-part of U.S. patent application Ser. No. 10/436,878 filed May 12, 2003 now U.S. Pat. No. 7,496,519; this patent document further is a continuation-in-part of U.S. patent application Ser. No. 10/437,405 filed May 12, 2003 now abandoned; U.S. patent application Ser. No. 10/437,405 is a continuation-in-part of U.S. patent application Ser. No. 09/259,657, filed Feb. 26, 1999 now U.S. Pat. No. 6,571,149, which is a continuation of U.S. patent application Ser. No. 08/748,243, filed on Nov. 12, 1996, now U.S. Pat. No. 5,910,896 entitled, "Shipment Transaction System and an Arrangement Thereof"; priority is claimed to these related documents under 35 U.S.C. §120 for common subject matter.

FIELD OF THE INVENTION

The present invention is directed to communications and data processing and, more specifically, to communications and data processing involving the processing of transactions involving multiple suppliers for a single transaction.

BACKGROUND

Operational management of contractual and transactional interactions between buyers, sellers, financial institutions and others involved in the exchange of products and/or services for purposes of commerce have typically been labor and time intensive. Generally, the processes of managing transactions between business entities have been unduly burdensome and inefficient.

Many transactions involve a variety of parties interacting at different hierarchical levels and in connection with different aspects of the transactions. For example, transactions involving different facets of performance (e.g., the provision of products or services) that can be fulfilled by different entities often involve two or more suppliers. For instance, when a transaction involves the provision of a multitude of goods, the goods may be sourced from different suppliers under the guise of the same transaction. Similarly, a service-based transaction may involve the provision of different aspects of service under the same contract. Further, transactions involving the purchase of a product often involve the provision of a product as well as shipping services for delivering the product from a seller to a buyer. These transactions also may involve processing services and/or fees along the delivery route, such as customs clearance at port of export, import/export duty fees, and insurance during transit, the responsibility for which can change amongst the parties depending on where the goods are actually located at a point in time. Using the shipping example, for many shipping transactions (e.g., that are separate from the purchase of goods being shipped), there is often a shipper (the entity arranging for shipment of the goods), a carrier (the entity carrying the goods), a seller (the entity selling the goods), an insurer (the entity providing transit insurance to the shipper, the carrier and/or the buyer), and a buyer (the entity receiving the goods). In this regard, the shipment itself can be considered a single shipping portion of a more complex transaction beginning with an agreement between a buyer and a seller. In some instances, the seller acts as the shipper and arranges and pays for shipment of the goods separately from the buyer and with the cost of the shipment effectively built into the cost of the goods. In other shipping transactions, the seller arranges for shipment of the goods per the buyer's instructions and the buyer pays for the shipping services directly to the party selected by the seller.

In the above-discussed and other types of transactions, the seller sometimes performs by providing goods and/or services directly and, at other times, the seller contracts with a performing party to perform some or all of the transaction aspects. In this instance, the seller acts as an intermediary, with the buyer agreeing to pay an amount contracted between the intermediary seller and the buyer. The seller in turn agrees to pay the performing parties (e.g., subcontractors) an amount contracted between the seller and each performing party.

In each of the above examples, various invoices and related activities (accounting, adjustments, etc.) are required for each contract in the chain of contracts between buying, selling, intermediary or performing parties. In addition, tracking activities for commercial and regulatory purposes often require that records be kept for the transaction. These activities are time consuming, subject to error and often duplicative in nature. For example, at the payment step, financial institutions for different parties to the transaction must interact with each other. This interaction typically involves complex agreements and associations that facilitate the transfer of funds. At times, there can be delays in payment or disputes regarding terms of payment. In addition, this process is highly susceptible to error. Interaction complexity, delay, error and a multitude of other characteristics of transaction payment can cost one or more parties to a transaction (including financial institutions) a significant amount of funds.

Most industries are quite competitive and any cost savings are therefore important. Administrative costs are targeted for reduction as no revenue is directly generated from administrative functions. However, administrative costs associated with commercial transactions have been difficult to reduce in the current business environment with widely diffused data.

The above and other difficulties in the management and coordination of business transactions have presented administrative and cost challenges to business entities involved in various aspects of transactions, including financial institutions and others.

SUMMARY

The present invention is directed to addressing challenges related to the types of applications discussed above and others. The present invention is exemplified in a number of implementations and applications, some of which are summarized below.

According to an example embodiment of the present invention, a transaction is automatically processed to effect payment to at least one supplier for the transaction as a function of portions of the transaction fulfilled by each supplier. In one implementation, transaction documents (e.g., electronic data) are audited and the payment is effected as a function of the audit. In another implementation, a fee is assessed to one or more parties to the transaction as a function of the transaction and an agreement with the one or more parties to the transaction.

In another example embodiment, shipping transactions involving at least one carrier fulfilling different portions (legs) of a shipping route are processed as a function of information received for each carrier and common transaction identification information. Each of the carriers submits an invoice and the invoices are correlated to a particular transaction. Payment is facilitated (e.g., authorized) as a function of the invoices.

According to another example embodiment of the present invention, an automated transaction processing system is adapted for facilitating transaction processing for a transaction involving at least one supplier. Contract data is stored for parties to a transaction. The contract data includes a transaction identification (ID) and information relating to a contract involving the exchange of merchant offerings (i.e., goods and/or services) between a buyer party and at least one supplier party, where each supplier fulfills a sub-part of the contract either at the direction of the buyer or at the direction of a third party. Payment request information including a transaction ID from the supplier party is sent to the automated transaction processing system. The payment request information (e.g., an invoice with a transaction ID) typically reflects payment characteristics of the transaction that are related to the merchant offerings provided by the supplier party providing the payment request information. The payment request information from each supplier party is audited as a function of a comparison of the transaction ID in the payment request information with the stored transaction ID in the contract data. When the transaction ID in the payment request information from a particular supplier party matches the transaction ID in the contract data, settlement of a sub-part of the contract involving merchant offerings provided by the particular supplier party is effected as a function of the payment request information from the particular supplier party and the sub-part of the contract.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention in connection with the accompanying drawings, in which.

Figure 1:
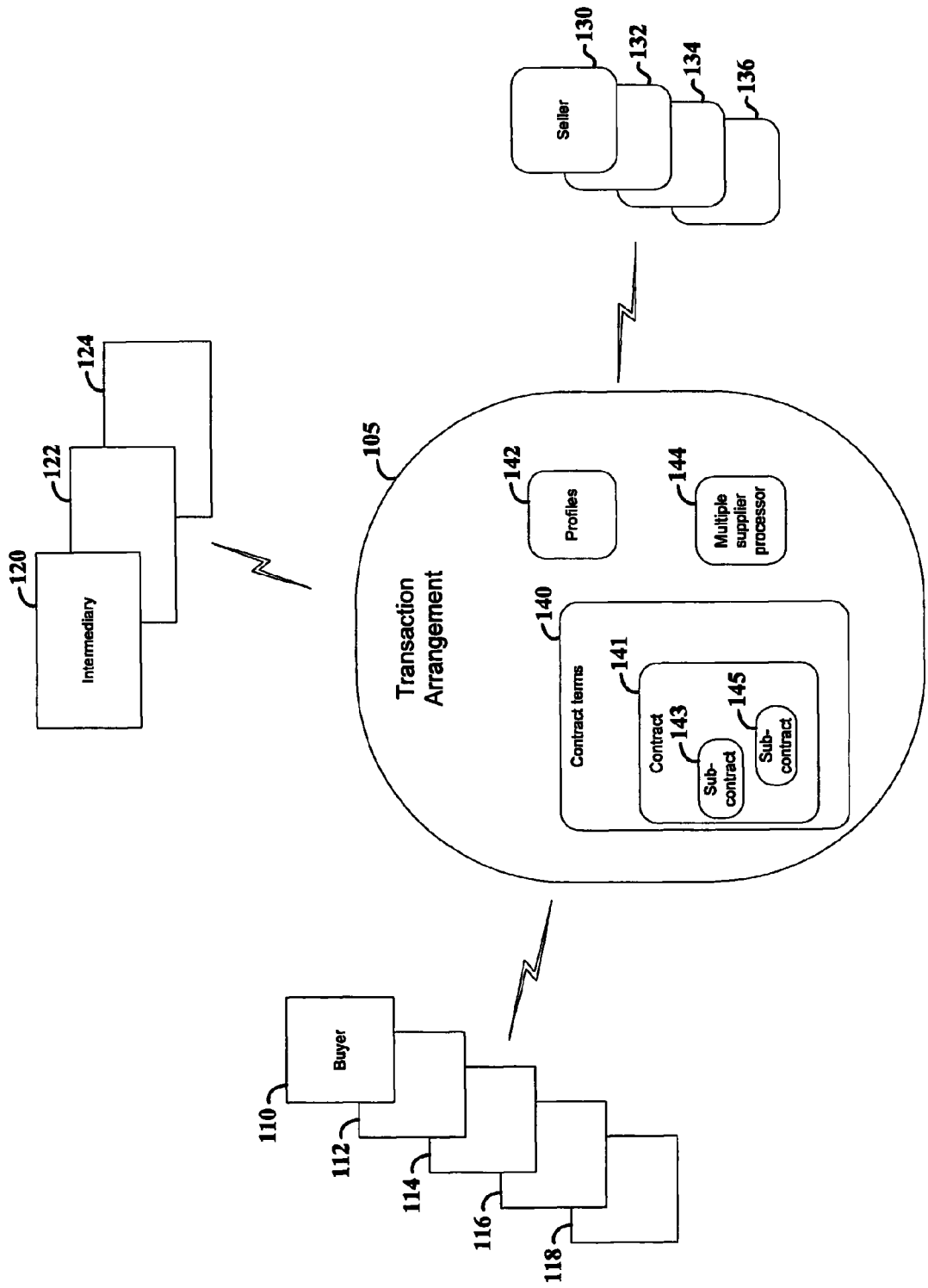
FIG. 1 shows a transaction processing arrangement and approach, according to an example embodiment of the present invention.

While the invention is amenable to various modifications and alternative forms, specifics thereof have been shown by way of example in the drawings and will be described in detail. It should be understood, however, that the intention is not necessarily to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of different types of communications and financial process management approaches, and has been found to be particularly useful for applications involving the implementation and application of payment-related transaction processes and related aspects thereof. While the present invention is not necessarily limited to such approaches, various aspects of the invention may be appreciated through a discussion of various examples using these and other contexts.

According to an example embodiment of the present invention, a transaction involving one or multiple suppliers is automatically processed using contractual (transaction-related) terms for each of the suppliers and one or more buying parties. Each of the suppliers fulfills a particular portion of the transaction, with the one or more buying parties receiving merchant offerings (e.g., goods and/or services) provided by the suppliers in accordance with terms of the transaction. When billing data (e.g., an invoice) is received from one of the suppliers, the data is automatically related to the particular transaction using information in the billing data together with stored information for the transaction. Funds from a buying party (or buying parties, where appropriate) are passed to the supplier as indicated in the contractual terms and in accordance with the billing data. Billing data submitted by subsequent suppliers is processed similarly. In this regard, each supplier is part of a common transaction and is paid according to the portion of the transaction fulfilled by the supplier. This approach is applicable to direct buyer-seller type relationships as well as to other relationships, such as those involving the buyer as an intermediary buyer/seller type party, subcontracting with suppliers to carry out conditions of a particular transaction.

In some applications, one or more suppliers to a transaction are generally isolated from information regarding the transaction that is not directly related to the particular supplier or suppliers. That is, transaction information associated with the supplier is separately processed and/or managed such that the supplier's view of the transaction is generally limited to portions of the transaction in which the supplier is specifically involved. In some instances, the supplier is limited in view of the transaction to contract-type functions, such as between the supplier and a buyer or intermediary buyer, and/or payment type functions, such as between the supplier and a financial institution providing payment for the transaction. In this regard, from each supplier's perspective, the "transaction" is limited to that involving the supplier, while from a buyer's (or intermediary's) perspective, the transaction involves multiple suppliers and/or separate sub-transactions that make up the whole transaction.

In one implementation, a fee is assessed to at least one party to the transaction as a function of one or more of a variety of transaction characteristics. In some applications, a host party (e.g., a supplier) is assessed a fee as a function of a payment amount for the transaction as characterized by a fee contract between the host party and an entity facilitating the transaction processing. In other applications, multiple parties are assessed fees in accordance with similar fee contracts and/or a transaction payment amount. These fees are further assessed, where appropriate, in a manner commensurate with sub-parts of the transaction (and related contract) performed by different suppliers.

Another example embodiment involves the electronic delivery of information. For example, streaming marketing information could be provided by multiple suppliers for a common transaction. As another example, telephone voice data can be delivered by two or more information carriers. These electronic delivery applications may involve, for example, the use of the Internet, telephone lines and/or transmission towers. Where streaming data is provided via the Internet, electronic data carriers may pick up data for delivery from one or more supplier source terminals to one or more destination terminals. In some applications, preloaded, password-secured profiles with profile data are used to launch the delivery of the electronic (e.g., streaming) data and/or the implementation of the data at a destination terminal.

In another example embodiment, a shipping transaction involving multiple carriers is processed using a unique order identification (ID) for different routes served by different carriers. The unique order ID is referenced to origin and destination locations for shipping an item over a primary route, with separate carriers performing portions of the route along which the item is shipped. Shipping invoices from the carriers are automatically associated with the primary route using information in the invoices. Further, the shipping invoices are separately associated with the portion of the route serviced by the particular carrier that is the subject of the invoice. This information is used to audit the invoices and to generate a payment authorization based upon the invoice (and, in some instances, effect the payment). Each carrier is paid according to its portion of the primary route. In some implementations, business rules and/or other information relating to the parties to the transaction (e.g., profile information) is stored and used for associating and/or auditing transaction data such as invoices. For general information regarding shipping transactions and for specific information regarding shipping transaction approaches that can be implemented in connection with this and/or other example embodiments herein, reference may be made to U.S. Pat. No. 5,910,896, which is fully incorporated herein by reference.

In another implementation, a pay-through-payment approach is used for paying sub-suppliers from buying parties while limiting the transaction, from a particular sub-supplier's perspective, to that arranged between the particular sub-supplier and an intermediary buying party. For instance, where a buying party is an intermediary and a product or service of the transaction is targeted to an outside buyer, payment for transaction performance by each respective supplier is processed directly from the outside buyer to the supplier as part of the processing of payment from the outside buyer to the intermediary supplier/buyer. However, transaction information for each sub-supplier is separately processed in accordance with terms associated with an individual transaction between the sub-supplier and the intermediary, with payment being separately processed (and made) by the intermediary and sourced from the outside buyer. In this regard, from a supplier's perspective, its portion of the transaction is limited to that between the supplier and the intermediary buyer, with payment coming from an outside source but made according to the transaction between the supplier and the intermediary. For general information regarding transaction processing and for specific information regarding pay-through-payment type approaches that can be implemented in connection with this and other example embodiments herein, reference may be made to U.S. patent application Ser. No. 11/316,381 filed on Dec. 22, 2005 and entitled: "Multi-Party Transaction Processing System and Approach", which is fully incorporated herein by reference.

In some implementations, an auditing process is carried out in connection with the receipt of the billing data discussed above. For instance, when billing data includes a seller's identification information (ID) associated with a particular identifiable transaction, the billing data is audited to ensure that the particular seller is indeed party to the identifiable transaction. Furthermore, terms of the billing data such as payment amount and/or other associated fees, timing (payment and/or contract performance) and others are selectively audited to ensure that certain transaction-based conditions are met.

In another example embodiment, business rules for buying and/or selling parties are used to process the transaction and further, where applicable, to control access to information relating to the transaction. For instance, where a buyer (or intermediary buying party) contracts with different sellers, business rules for the buyer are used in processing the transaction. These rules may include, for example, rules for setting contract terms, making payment or providing information to seller parties. In addition, the business rules can be tailored to specific transactions, with certain transaction terms set for the specific transaction.

In some implementations, the business rules include information for differentiating between suppliers for applying particular rules. That is, a particular transaction involving two different suppliers is processed according to different business rules. Portions of the transaction relating to a particular seller are processed in accordance with business rules for that particular seller, with other portions of the transaction involving other sellers being processed according to business rules for each particular seller, where applicable. For instance, a buyer and seller may agree upon specific business transaction terms, such as payment time, payment type, shipping fees and more. These specific business transaction terms can be separately recorded in association with business rules that apply to a particular seller.

In one implementation, business rules are selectively applied to a particular seller according to characteristics related to the seller and/or the transaction; different sets of business rules may apply to a particular seller. For example, transaction characteristics such as geographic location, location of the particular transaction with the seller (or of a substantial portion of the transaction with the seller) or associations between the seller and other entities may benefit form the selective application of business rules.

A variety of transaction processing functions, including those discussed above, can be carried out implementing business rules for purposes including the association of transaction data, selection of contract terms, management of contract payment and/or auditing functions and more. For general information regarding contracts and transaction processing, and for specific information regarding contract and transaction processing approaches to which the present invention may be applicable, reference may be made to U.S. patent application Ser. No. 10/436,878, filed May 12, 2003 and fully incorporated herein by reference.

Turning now to the figures, FIG. 1 shows a transaction processing arrangement and approach, according to another example embodiment of the present invention. A transaction arrangement 105 manages transactions between buying parties and two or more parties that facilitate the provision of goods and/or services (e.g., merchant offerings) in accordance with a particular transaction for which payment is to be made (e.g., via interaction with one or more financial institutions). Here, a plurality of transaction parties including buyer parties 110-118, intermediary parties 120-124 and selling parties 130-136 are shown by way of example. While certain buying, intermediary and selling parties are shown, this example embodiment and related approaches are applicable to a multitude of such parties, as well as to additional types of transactional parties (or fewer parties, e.g., with no intermediary party and/or a single buyer with two sellers), which may be implemented for a variety of situations.

The transaction arrangement 105 stores data (locally and/or or remotely) relating to contract terms 140 and user profiles 142, and further processes transaction functions using a multiple supplier processor 144. The contract terms 140 include information for specific contracts related to transactions processed by the transaction arrangement 105. The contract terms 140 can govern a single transaction, such as in a spot bid/award situation, or multiple transactions, such as a multi-year contract for timed deliveries of particular goods. By way of example, one contract 141 is shown stored with the contract terms 140 and includes sub-contracts 143 and 145 for different sellers for a common transaction.

The user profiles 142 include information about parties to each transaction, such as financial account information that facilitates the execution of payment functions for the transaction, or information such as passwords facilitating access control to transaction information. The multiple supplier processor 144 is programmed for processing transaction related data such as order confirmation, shipping confirmation, payment authorization and settlement details for facilitating the transaction and payment-related aspects thereof.

The contract terms 140 describe information for particular contracts between a buyer or buyers and two or more sellers, with each seller performing a portion of the transaction. These contract terms 140 may, for example, include contract terms specific to a particular seller and/or to a particular transaction, where contract terms may or may not vary between different sellers, depending upon the application. For instance, when buyer 110 has a separate contract with sellers 130 and 132 for a single transaction, the multiple supplier processor 144 implements specific contract information related to the particular seller for which the portion of the transaction is being processed. That is, when processing transaction functions such as payment for a particular transaction involving the buyer 110 and sellers 130 and 132, the multiple supplier processor 144 uses different contract terms when processing portions of the same transaction but involving a different selling party. When the contract terms 140 include contract terms that are consistent among different sellers for a particular transaction, these terms are implemented consistently (relative, e.g., to the separately implemented terms discussed above).

In some applications involving intermediary parties (120-124), the transaction arrangement 105 processes the transactions supplied by two or more of the sellers 130-136 and received (goods and/or services) by one or more buyers 110-118. For example, where an intermediary party 120 executes a transaction with a buyer 110 for shipping goods along a particular main shipping route, the intermediary party may contract separately with two or more sellers (carriers) 130 and 132. Here, the buyer 110 may be the recipient of goods being shipped or the provider of goods that will be shipped to a customer. The transaction is related to a particular service, namely, the shipping of goods over the particular main shipping route (from an origin to a destination) as indicated by the buyer or other entity, and the transaction is accordingly referenced as such. However, each seller (carrier) performs shipping functions over separate sub-routes that make up the route between the origin and the destination, from the origin to an intermediate location and, subsequently, from that intermediate location to the destination. The transaction arrangement 105 processes, with the multiple supplier processor 144, transaction information relating to payment for each of the sellers (carriers) 130 and 132 for their respective services performed with each sub-route by reference to the main shipping route.

The multiple supplier processor 144 carries out payment and other interactive type functions with buyers, sellers and, where applicable, intermediaries in a variety of manners, depending upon the contract terms 140 and profiles 142. For instance, a particular contract between a buyer 110 and a seller 130 may indicate when payment is to be effected. In some applications, payment to the seller 130 is effected upon completion of the seller's portion of the transaction (e.g., in the above example, when a seller (carrier) performs its portion of the shipment route). In other applications, payment to the seller 130 is effected upon completion of the entire transaction (e.g., in the above example, when the shipment reaches its destination). A multitude of types of terms such as these are implemented with the contract terms 140 and processed by the multiple supplier processor 144, depending upon the application and particular contracts between parties to the transactions.

In another embodiment, the multiple supplier processor 144 facilitates processing for transactions involving a contract that is fulfilled over time. For example, where a buyer 110 enters into a contract with an intermediary party 120 for merchant offerings over a particular time period, the multiple supplier processor 144 processes payment functions for sub-parts of the contract as they are fulfilled over time by different suppliers (e.g., using a common transaction ID). This approach can be implemented, for example, when the intermediary party 120 contracts with the buyer 110 for providing a particular bundle of goods at intervals. The intermediary party 120 may then contract with suppliers 130 and 132 for providing the bundle of goods at different times. In this regard, the multiple supplier processor 144 processes invoice information received from the suppliers 130 and 132 submitted, e.g., as they respectively fulfill the sub-parts of the contract.

In another example embodiment, an intermediary party 120 operates the transaction arrangement 105 for processing transactions between buyers 110-118 and sellers 130-136 according to contract terms 140 supplied by the transaction parties and further assessing a processing fee to one or more of the transaction parties. For example, where a buyer 110 contracts with two sellers 130 and 132 for respectively filling sub-components of a transaction, the buyer may enlist the services of the transaction arrangement 105 for processing financial aspects of the transaction. The multiple supplier processor 144 processes transaction information, such as invoices received from the sellers 130 and 132, by associating the invoices with a particular transaction and further with the particular seller providing the invoice. The association is used to determine elements of the contract terms 140 to use in processing (e.g., auditing) the invoices and correspondingly effecting payment therefore. The payment authorization is matched to a particular transaction at block 310. The matching may involve using, for example, transaction-identifying or party-identifying information in the payment authorization.

Fees are assessed according to one or more of a variety of characteristics, such as the financial aspects of the transaction (e.g., the amount of a sale processed by the transaction arrangement 105) or a set fee. These fees may, for example, be set as a function of a contract between the intermediary party 120 and parties (buyers or sellers) to the transaction.

In another example embodiment, the transaction arrangement 105 is adapted for processing financial transactions involving two or more financial suppliers (i.e., fund suppliers) providing funds to a buyer, seller or other appropriate party participating in a particular transaction. Each of the financial suppliers provides sub-parts of a fund amount to the buyer or seller to fund classes of transactions that meet defined parameters (e.g., specific goods procured by defined buyers from defined sellers). Payment type data, such as a fee assessed for providing funds for a sub-part to the financial transaction, provided by each financial supplier is processed by the multiple supplier processor 144 using a common transaction ID. This approach can be implemented, for example, where a buyer uses multiple financiers to provide funds for particular transactions meeting defined funding parameters, implementing separate contract terms 140 for financial services provided by each financier.

In one implementation, two or more financial suppliers provide funds in different currencies for a particular financial transaction. The transaction arrangement 105 processes sub-parts of a transaction for each currency as provided by different financial suppliers (e.g., wherein a first supplier provides funds in a first currency and a second supplier provides funds in a second currency, for use in a common transaction). Each financial supplier references a common transaction ID when providing payment type data to the transaction arrangement 105. One example application to which this implementation may be applied involves a buyer in a first country purchasing goods and/or services from a seller in a second country. A first financial supplier provides funds in a first currency on behalf of the buyer and accordingly assesses a fee (e.g., in the amount of the provided funds plus a service and/or financing charge). A second financial supplier provides funds in a second currency on behalf of the seller and assesses a fee (e.g., in a converted amount of the provided funds in the second currency plus a service and/or financing charge). In certain related applications, a second financial supplier considers the identity of the buyer and the first financial supplier when making its decision as to whether to provide funds to the supplier (e.g., in pre-export financing situations or in post-export, pre-ownership assumption situations). Rules or other characteristics related to the transaction and/or transaction parties may thus contemplate the second financial supplier's consideration of one or more of the identity of the buyer and the first financial supplier. In all these implementations, the fees are selectively assessed to the buyer and/or to a party to a transaction for which funds in the financial transaction are being provided.

The association approach described above may be implemented using, for example, one or more of the embodiments and implementations described in connection with U.S. patent application Ser. No. 10/864,761, filed Jun. 9, 2004, which is fully incorporated herein by reference. Furthermore, other transaction processing approaches discussed herein may implement such association approaches in the processing of multiple-supplier type transactions that involve sub-transaction components associated with a particular main transaction and the according processing thereof.

Figure 2:
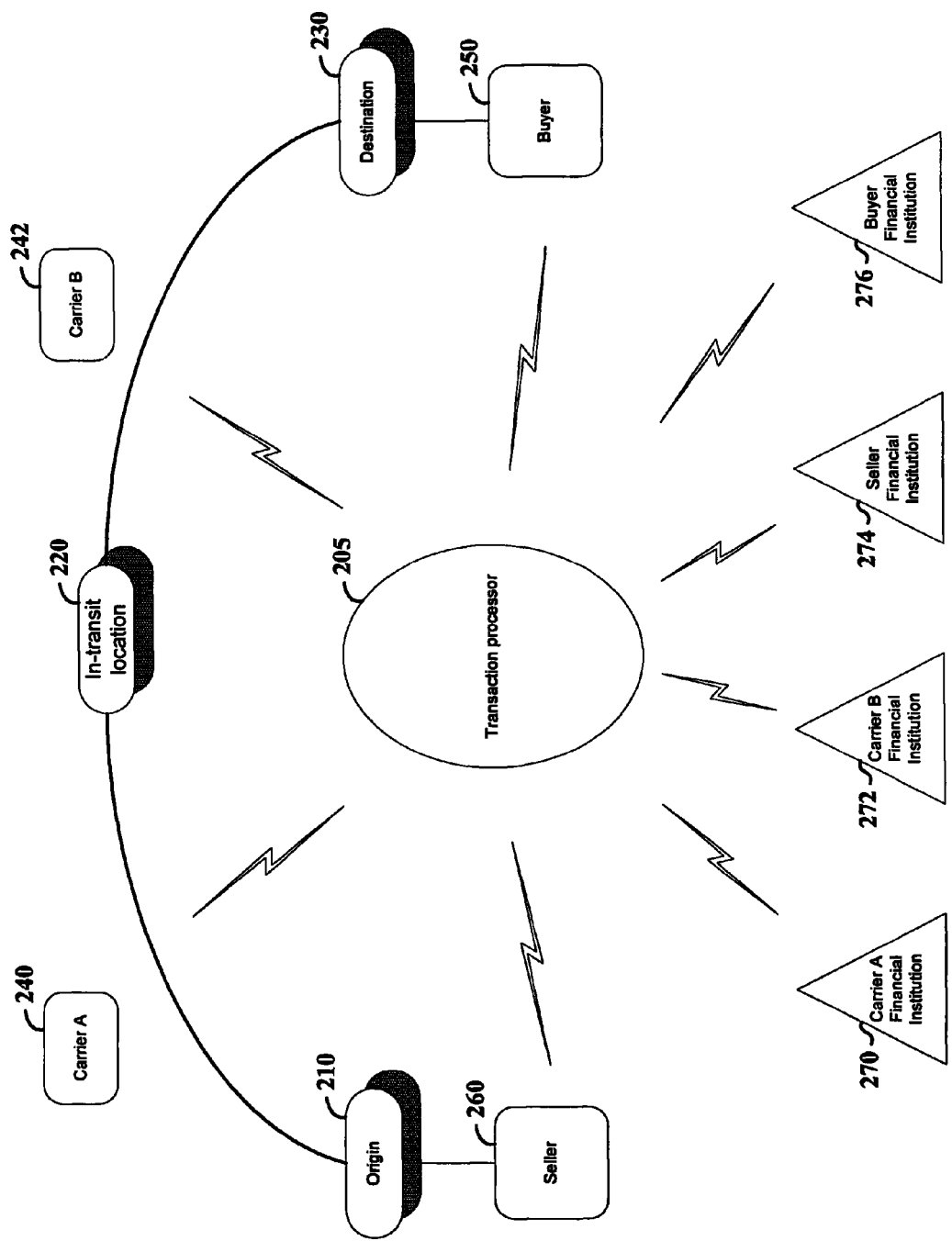
FIG. 2 shows an arrangement and approach for managing shipping-related transactions, according to another example embodiment of the present invention.

FIG. 2 shows an arrangement and approach for managing shipping-related transactions via a transaction processor 205, according to another example embodiment of the present invention. The approach shown in FIG. 2 can be implemented in connection with transaction processing approaches as described, for example, in connection with FIG. 1 above. The approach shown in FIG. 2 involves processing a shipment transaction between an origin 210 and a destination 230, with a seller 260 providing an item to be shipped at the origin to a buyer 250 purchasing the item and receiving the item at the destination 230. In some instances, a third party buyer receives the item at the destination 230 where, e.g., the buyer 250 may in turn invoice the third party buyer for the item.

Carrier A (240) ships the item from the origin 210 to an in-transit location 220 and carrier B (242) ships the item from the in-transit location to the destination 230. In this regard, the total shipping route, between the origin 210 and the destination 230 is served by two sub-routes with the in-transit location 220. Each carrier 240 and 242 references the sub-component of the shipping route it performs by simply referring to an overall transaction ID that is common to the entire shipping transaction, regardless of which portion of the transaction is involved.

The transaction processor 205 facilitates the processing of contractual and payment functions of the transaction involving the shipment from the origin 210 to the destination 230. In this regard, the transaction processor 205 is in communication with each party to the transaction as described above, electronically or otherwise, as well as to financial institutions for the parties to the transaction, with example institutions 270-275 respectively serving carrier A, carrier B, the seller and the buyer.

In one example, the transaction processor 205 processes a shipping transaction as follows, using a transaction ID to reference portions of the transaction fulfilled by the different carriers. A seller or transaction management entity provides transaction information to the transaction processor for use in identifying invoices and other data received in connection with the transaction. This information includes contract information, transaction party profile information (e.g., identification and financial institution) and more.

When carrier A (240) performs its portion of the transaction, it submits an invoice to the transaction processor 205, the invoice referencing the common transaction ID. Similarly, when carrier B (242) performs its portion of the transaction, it submits an invoice to the transaction processor 205, also referencing the same transaction ID. The transaction processor takes the invoice information and facilitates payment as a function of the contract information by matching information in the invoice with the transaction (e.g., using the common transaction ID with the source of the invoice). For example, where the contract information indicates that carrier A is not to be paid until receipt of the shipped items at the in-transit location 220, such receipt is used to authorize payment processing at the transaction processor. Alternately, the contract information may indicate that carrier A is not to be paid until receipt of the shipped items at the destination 230. The invoice for carrier B may be similarly processed. Other contractual characteristics, such as payment date, acceptance of items shipped and more, where applicable, are further implemented by the transaction processor 205 in generating an authorization for payment of an invoice.

When payment for an invoice is authorized successfully, the transaction processor 205 further facilitates payment by communicating with one or more of the financial institutions 270-276 such that the carriers are paid for the services they provide, from the buyer 250 and/or the seller 260, depending upon the particular transaction and contract terms. Funds for the carriers are provided from the buyer 250 and/or from the seller 260, depending upon the application. For instance, where the seller 260 is a shipper contracting with the buyer 250 for shipment of the items, the seller would generally invoice the buyer directly for an agreed-upon transaction fee. In turn, the seller would be invoiced by the carriers for their portion of the transaction fee. In this instance, where indicated by contract terms available to the transaction processor 205, the seller 260 may provide funds via the seller financial institution 274 to each of the carrier financial institutions 270 and 272. Payment for the overall transaction is made to the seller financial institution 274 via the buyer financial institution 276 (e.g., separately from payment to the carriers). In some applications, the seller 260 directs the transaction processor to pay each carrier financial institution (270, 272) from funds provided by the buyer 250 via the buyer financial institution 276 directly to each carrier financial institution. The remaining funds (if any) available from the buyer 250 are then provided to the seller.

In other instances, the buyer 250 contracts separately with the carriers 240 and 242 for shipping the items and further accordingly makes funds available via the buyer financial institution 276 for payment upon approval of invoices submitted by the respective carriers. In these instances, the transaction processor 205 would implement contract terms between the buyer 250 and carriers 240 and 242 for facilitating the payment, with a common transaction ID representing the entire shipment route from the origin 210 to the destination 230 being implemented for associating the invoices with the transaction.

Figure 3:
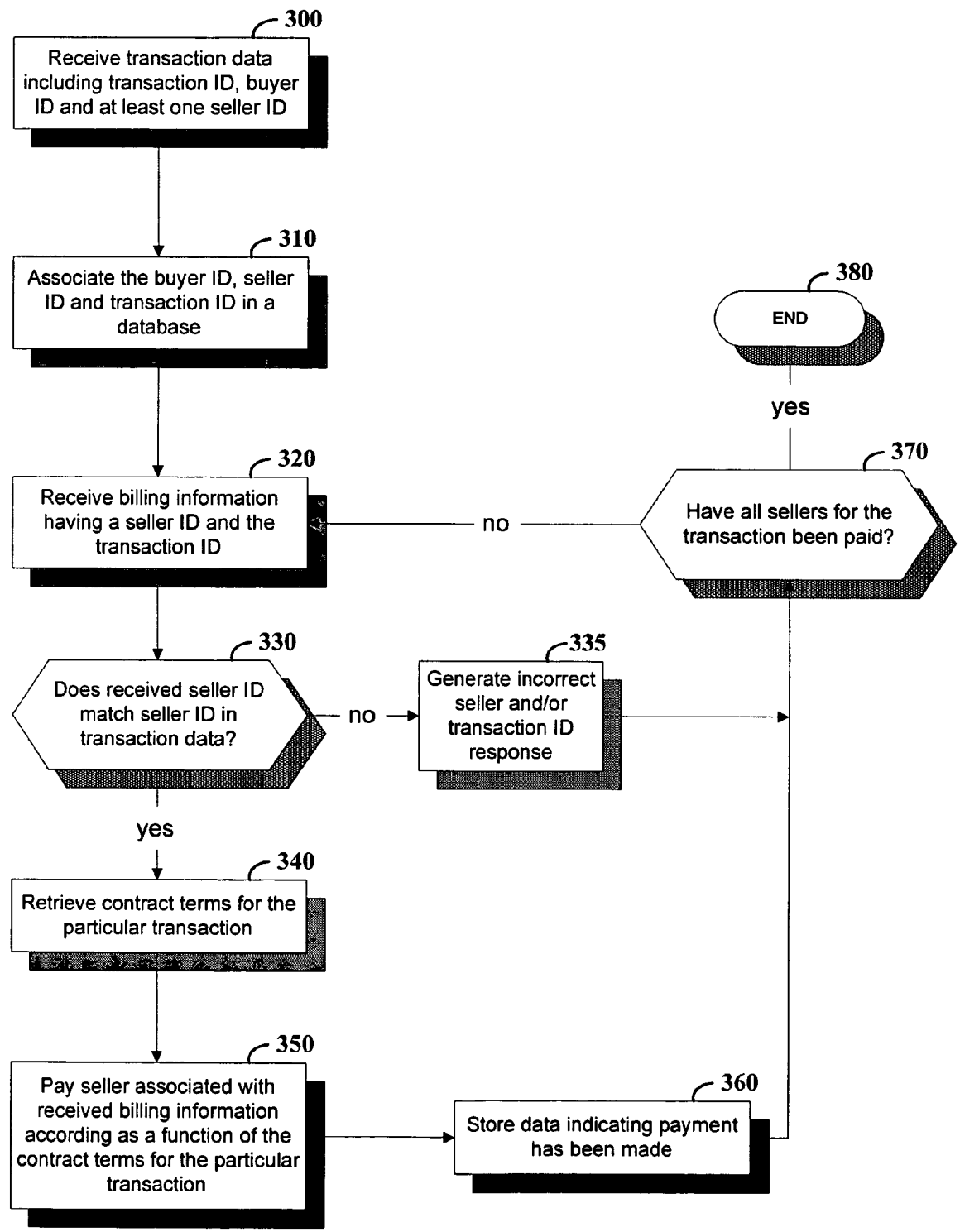
FIG. 3 shows a flow diagram for transaction processing, according to another example embodiment of the present invention.

FIG. 3 shows a flow diagram for transaction processing, according to another example embodiment of the present invention. The approaches described in connection with the flow diagram in FIG. 3 can be implemented using one or more types of transaction arrangements and may, for example, involve the use of one or more of the arrangements or components thereof as shown in FIGS. 1 and/or 2 and described in connection therewith. At block 300, transaction data including a transaction identification (ID), buyer ID and at least one seller ID is received, e.g., at a transaction processing location/arrangement. The buyer ID, seller ID and transaction ID are associated in a database, linking the buyer and seller IDs with the transaction to which the transaction ID is assigned.

At block 320, billing information for a portion of the transaction fulfilled by a seller is received with that seller's ID and the transaction ID. The billing information is communicated using, for example, an electronic invoice sent via a communications network to a transaction processing node on the communications network. If the seller ID does not match a seller ID associated with the transaction to which the transaction ID is assigned at block 330, an incorrect seller and/or transaction ID response is generated at block 335. The incorrect seller and/or transaction ID response may include, for example, one or more of notifying the seller providing the billing information that the match failed, notifying a buyer in the transaction that the match failed or resolving the issue. A mismatched seller ID can be resolved, e.g., by comparison of the received seller ID with known seller IDs for the transaction and associating the received seller ID with a known seller ID using a typographic-tolerance or other approach.

If the seller ID matches a seller ID associated with the transaction data (i.e., with the transaction ID) at block 330, contract terms for the particular transaction associated with the transaction ID are retrieved at block 340. At block 350, the seller associated with the seller ID is paid as a function of the contract terms for the particular transaction associated with the transaction ID. This approach at blocks 340 and 350 may involve, for example, retrieving contract terms from a database, stored under the transaction ID, and authorizing or otherwise facilitating payment for the transaction based upon the contract terms and the received billing information. In some instances, the billing information is audited at block 350 as part of the payment process, with payment authorized or facilitated as a function of the auditing (i.e., when the billing information is consistent with and/or within range of expected or acceptable billing information, payment is authorized).

After the seller has been paid at block 350, payment data indicating the payment for the transaction in accordance with the billing information is stored at block 360. In some instances, this payment data is stored with the received billing information. After the payment data has been stored at block 360, or after an incorrect seller and/or transaction ID response is generated at block 335, stored payment data is parsed to determine, at block 370, whether all sellers for the transaction have been paid. If all sellers for a particular transaction have indeed been paid, the process stops at block 380. If all sellers for a particular transaction have not been paid, the process continues at block 320 when additional sellers submit billing information.

While certain aspects of the present invention have been described with reference to several particular example embodiments, those skilled in the art will recognize that many changes may be made thereto without departing from the spirit and scope of the present invention, aspects of which are set forth in the following claims.

What is claimed is:

1. An automated transaction arrangement comprising:
   a database that stores contract data for parties to a transaction, the contract data including a transaction identifier (ID) and information relating to a contract for an exchange of merchant offerings involving a buyer and a plurality of suppliers, the contract including a plurality of sub-parts for fulfillment, each of the suppliers fulfilling at least one of the sub-parts of the contract; and
   an automatic transaction processor circuit configured to:
      receive order information from the buyer, the order information identifying merchant offerings that the buyer desires to purchase, the order information indicating quantities of the merchant offerings that the buyer desires to purchase, and the order information indicating a monetary amount that the buyer expects to pay for the merchant offerings,
      receive an invoice from each of the suppliers as the suppliers fulfill the sub-parts of the contract, wherein for each respective supplier in the plurality of suppliers, the invoice from the respective supplier includes the transaction ID,
      for each respective supplier in the plurality of suppliers, determine a condition of payment authorization for the invoice from the respective supplier by auditing the invoice from the respective supplier against the received order information and against the stored contract data associated with the transaction ID, and
      for each respective supplier in the plurality of suppliers, respond to the condition of payment authorization for the invoice from the respective supplier indicating that payment to the respective supplier is appropriate by facilitating settlement processing of the invoice from the respective supplier as a function of the invoice from the respective supplier and at least a subpart of the contract to which the invoice from the respective supplier applies.

2. The arrangement of claim 1, wherein for each respective supplier in the plurality of suppliers, the automatic transaction processor is further configured and arranged to assess a fee for facilitating settlement as a function of at least one of: the invoice from the respective supplier, the contract data, and fee data assigned to at least one of the parties to the transaction.

3. The arrangement of claim 1, wherein the automatic transaction processor is configured to:
   for each respective supplier in the plurality of suppliers, generate electronic payment data for providing payment from the buyer to the respective supplier by cross-correlating the received invoice from the respective supplier and of sub-parts of the contract that the respective supplier fulfills with stored correlation data linking the respective supplier with the buyer and with one of the sub-parts of the contract, and for each respective supplier in the plurality of suppliers, audit, using predefined terms for the buyer as inputs, the invoice from the respective supplier on a line-item basis for a sub-part of the contract pertaining to line-items therein, for generating electronic payment instructions for controlling external institution-based systems for effecting payment for the line-items.

4. The arrangement of claim 3, wherein, for each respective supplier in the plurality of suppliers, the automatic transaction processor is configured to facilitate settlement processing by processing payment from the buyer to the respective supplier as a function of invoices received at different times from the respective supplier and of sub-parts of the contract that the respective supplier fulfills.

5. The arrangement of claim 1,
wherein the database is configured to store profile data for the buyer, the profile data for the buyer including financial processing information that specifies timing variables for auditing the payment of received invoices pertaining to the buyer, and
wherein the automatic transaction processor is configured to facilitate settlement processing for the transaction by correlating the timing variables to the received invoices, using the profile data for the buyer and profile data for the suppliers, and by transferring funds from the buyer to the suppliers as a function of the profile data for the buyer and the profile data for the suppliers, in response to the correlation and the received invoices conforming to the timing variables.

6. The arrangement of claim 1,
wherein the transaction is a shipping transaction involving the buyer purchasing carrier services from the suppliers, the suppliers supplying carrier services, and
wherein the automatic transaction processor is configured, for each respective supplier in the plurality of suppliers, to facilitate settlement processing of the invoice received from the respective supplier for a sub-part of a carrier route serviced by the respective supplier.

7. The arrangement of claim 6, wherein for each respective supplier in the plurality of suppliers, the automatic transaction processor is configured to:
audit the invoice from the respective supplier by comparing a payment amount in the invoice from the respective supplier to a payment amount in a sub-part of the contract pertaining to the respective supplier and to the transaction ID, and
facilitate payment to the respective supplier for its carrier services as a function of the audit.

8. The arrangement of claim 1,
wherein the transaction involves the buyer purchasing a bundle of goods from the plurality of suppliers, a particular supplier in the plurality of suppliers supplying a portion of the bundle, and
wherein the invoice received from the particular supplier includes the transaction ID and a cost of the portion of the bundle supplied by the particular supplier; and
wherein the automatic transaction processor is configured to
facilitate settlement processing of the invoice from the particular supplier by tendering payment to the particular supplier for its supplied goods in accordance with the invoice from the particular supplier and a sub-part of a contract to which the invoice from the particular supplier applies.

9. The arrangement of claim 1,
wherein the transaction is a financial transaction in which the buyer finances another transaction using a pool of funds, a particular supplier in the plurality of suppliers providing a portion of the pool of funds as specified in the stored contract data, and
wherein the automatic transaction processor is configured to facilitate settlement processing of a sub-part of the contract involving funds provided by the particular supplier in accordance with the stored contract data.

10. The arrangement of claim 9,
wherein the database stores pre-defined parameters for the particular supplier, the pre-defined parameters for the particular supplier specifying characteristics of transactions for which the particular supplier will supply funds for the pool of funds, and
wherein the automatic transaction processor is configured to facilitate settlement processing for a portion of the pool of funds as a function of the stored pre-defined parameters for the particular supplier.

11. The arrangement of claim 1,
wherein the transaction involves the buyer, the plurality of suppliers, and an intermediary, the contract data including contract data for contracts between the buyer and the intermediary and contracts between the intermediary and the suppliers, and
wherein the automatic transaction processor is configured to facilitate settlement processing of the sub-parts of the contract by providing funds to the suppliers directly from the buyer as a function of the contracts between the intermediary and the suppliers.

12. The arrangement of claim 1, wherein, for each respective supplier in the plurality of suppliers, the automatic transaction processor is configured to audit the invoice from the respective supplier by comparing the invoice from the respective supplier to payment terms in the stored contract data and, in response to the invoice from the respective supplier satisfying the payment terms in the stored contract data, to authorize payment for the invoice from the respective supplier.

13. The arrangement of claim 1, wherein the automated transaction arrangement is configured to use transaction profile information to authorize transaction parties and to provide access to the stored contract data.

14. A processor-implemented method comprising:
storing contract data for parties to a transaction, the contract data including a transaction identifier (ID) and information relating to a contract for an exchange of merchant offerings involving a buyer and a plurality of suppliers, the contract including a plurality of sub-parts for fulfillment, each of the suppliers fulfilling at least one of the sub-parts of the contract;
receiving, at an automated transaction processor, order information from the buyer, the order information identifying merchant offerings that the buyer desires to purchase, the order information indicating quantities of the merchant offerings that the buyer desires to purchase, and the order information indicating a monetary amount that the buyer expects to pay for the merchant offerings;
receiving, at the automated transaction processor, an invoice from each of the suppliers, wherein for each respective supplier in the plurality of suppliers, the invoice from the respective supplier includes the transaction ID;
for each respective supplier in the plurality of suppliers, auditing, by the automated transaction processor, the invoice from the respective supplier against the received order information and against the stored contract data associated with the transaction ID; and
for each respective supplier in the plurality of suppliers, facilitating, by the automated transaction processor, settlement of at least a sub-part of the contract involving merchant offerings provided by the respective supplier as a function of the invoice from the respective supplier and the contract.

15. The method of claim 14, wherein for each respective supplier in the plurality of suppliers, auditing the invoice from the respective supplier includes comparing a quantity and monetary amount of merchant offerings specified in the invoice from the respective supplier with the stored contract data, and wherein the method further comprises, for each respective supplier in the plurality of suppliers, authorizing payment for the invoice from the respective supplier in response to the quantity and monetary amount of merchant offerings specified in the invoice for the respective supplier matching corresponding quantity and monetary amount information for the contract.

16. The method of claim 14, wherein the sub-parts of the contract are to be carried out at different times, wherein receiving the invoice from each of the suppliers includes receiving the invoices from different ones of the suppliers at different times for different ones of the sub-parts of the contract.

17. The method of claim 14, wherein the contract has multiple line items to be fulfilled by different ones of the suppliers, and wherein receiving the invoice from each of the suppliers includes receiving the invoices from different ones of the suppliers at different times for different ones of the line items of the contract.

18. The method of claim 14, wherein for each respective supplier in the plurality of suppliers, facilitating settlement of a sub-part of the contract involving merchant offerings provided by the respective supplier includes assessing a processing fee to at least one party to the subpart of the contract.

19. An automated transaction arrangement comprising:

means for storing contract data for parties to a transaction, the contract data including a transaction identifier (ID) and information relating to a contract for an exchange of merchant offerings involving a buyer and a plurality of suppliers, the contract including a plurality of sub-parts for fulfillment, each of the suppliers fulfilling at least one of the sub-parts of the contract;

means for receiving order information from the buyer, the order information identifying merchant offerings that the buyer desires to purchase, the order information indicating quantities of the merchant offerings that the buyer desires to purchase, and the order information indicating a monetary amount that the buyer expects to pay for the merchant offerings;

means for receiving an invoice from each of the suppliers, wherein for each respective supplier in the plurality of suppliers, the invoice from the supplier includes the transaction ID;

means for determining, for each respective supplier in the plurality of suppliers, a condition of payment authorization for the invoice from the respective supplier by auditing the invoice from the respective supplier against the received order information and against the stored contract data associated with the transaction ID; and means for facilitating, for each respective supplier in the plurality of suppliers, responsive to the condition of payment authorization indicating that payment to the respective supplier is appropriate, settlement processing of the invoice from the respective supplier as a function of the invoice from the respective supplier and at least a sub-part of the contract to which the invoice from the respective supplier applies.

* * * * *